US009559902B2

(12) United States Patent
Payette et al.

(10) Patent No.: US 9,559,902 B2
(45) Date of Patent: Jan. 31, 2017

(54) DISTRIBUTED STATE MODEL FOR SYSTEM CONFIGURATION SYNCHRONIZATION

(71) Applicant: Microsoft Corporation, Redmond, WA (US)

(72) Inventors: Bruce G. Payette, Bellevue, WA (US); Narayanan Lakshmanan, Bothell, WA (US); Nitin Gupta, Redmond, WA (US); Xuejian Pan, Redmond, WA (US); Sharath Gopalappa, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 201 days.

(21) Appl. No.: 13/921,158

(22) Filed: Jun. 18, 2013

(65) Prior Publication Data
US 2014/0359096 A1 Dec. 4, 2014

Related U.S. Application Data

(60) Provisional application No. 61/830,128, filed on Jun. 2, 2013.

(51) Int. Cl.
*G06F 15/177* (2006.01)
*H04L 12/24* (2006.01)
(Continued)

(52) U.S. Cl.
CPC ....... *H04L 41/0806* (2013.01); *G06F 9/44505* (2013.01); *G06F 9/45512* (2013.01); *G06F 9/52* (2013.01)

(58) Field of Classification Search
CPC .............. H04L 41/0805; H04L 41/0806; G06F 9/44505; G06F 9/45512; G06F 9/52
(Continued)

(56) References Cited

U.S. PATENT DOCUMENTS 6,101,508 A * 8/2000 Wolff .................. G06F 9/52
  707/999.001
6,259,448 B1   7/2001 McNally et al.
(Continued)

FOREIGN PATENT DOCUMENTS

WO      2005/045559 A2    5/2005

OTHER PUBLICATIONS

White, et al., "Automated Reasoning for Multi-step Feature Model Configuration Problems",In Proceedings of the 13th International Software Product Line Conference, Aug. 24, 2009, 10 pages.
(Continued)

*Primary Examiner* — Thu Ha Nguyen
(74) *Attorney, Agent, or Firm* — Ben Tabor; Kate Drakos; Micky Minhas

(57) ABSTRACT

Systems and methods for configuring applications and resources on distributed nodes or machines are disclosed. A node exposes a synchronization resource that corresponds to a desired state on a remote resource. The node evaluates a state of the remote resource. A test function may be defined to check whether the remote resource is in the desired state. A set function may also be defined to set a state of the synchronization resource when the remote resource is in the desired state. The node configures the synchronization resource when the remote resource is in the desired state. The synchronization resource may be configured, for example, using a resource provider. The node may evaluate the states of a plurality remote resources. The synchronization resource may be configured when one or more of the remote resources are in the desired state or when all of the remote resources are in the desired state.

17 Claims, 4 Drawing Sheets

(51) Int. Cl.
*G06F 9/445* (2006.01)
*G06F 9/455* (2006.01)
*G06F 9/52* (2006.01)

(58) Field of Classification Search
USPC ........ 709/218, 220, 227, 229, 222; 370/254; 712/15; 707/617, 620; 340/681, 3.2, 4.2
See application file for complete search history.

(56) References Cited

U.S. PATENT DOCUMENTS

| | | | |
|---|---|---|---|
| 6,502,213 B1 * | 12/2002 | Bowman-Amuah | G06F 9/4433 710/266 |
| 6,535,975 B1 | 3/2003 | Thompson et al. | |
| 6,578,068 B1 * | 6/2003 | Bowman-Amuah | G06F 9/505 709/203 |
| 6,640,244 B1 * | 10/2003 | Bowman-Amuah | G06F 9/466 707/999.01 |
| 7,010,576 B2 | 3/2006 | Bae | |
| 7,089,141 B2 | 8/2006 | Schmit | |
| 7,539,760 B1 * | 5/2009 | Petry | G06F 15/16 709/220 |
| 8,166,171 B2 | 4/2012 | Murray et al. | |
| 8,626,867 B2 * | 1/2014 | Boudreau | H04W 4/08 455/414.1 |
| 2003/0009571 A1 * | 1/2003 | Bavadekar | H04L 12/4633 709/230 |
| 2003/0126200 A1 * | 7/2003 | Wolff | G06F 9/52 709/203 |
| 2005/0262501 A1 | 11/2005 | Marinelli et al. | |
| 2006/0047836 A1 * | 3/2006 | Rao | H04L 63/0272 709/229 |
| 2007/0078959 A1 * | 4/2007 | Ye | 709/223 |
| 2008/0183800 A1 * | 7/2008 | Herzog et al. | 709/202 |
| 2008/0201454 A1 * | 8/2008 | Soffer | H04L 12/24 709/220 |
| 2008/0289029 A1 * | 11/2008 | Kim et al. | 726/12 |
| 2008/0320109 A1 | 12/2008 | Andrews et al. | |
| 2009/0158292 A1 | 6/2009 | Rattner et al. | |
| 2009/0193443 A1 * | 7/2009 | Lakshmanan et al. | 719/330 |
| 2010/0049959 A1 | 2/2010 | Arcese et al. | |
| 2010/0217837 A1 * | 8/2010 | Ansari et al. | 709/218 |
| 2010/0223096 A1 * | 9/2010 | Bosan et al. | 705/10 |
| 2011/0141895 A1 * | 6/2011 | Zhang | 370/235 |
| 2011/0320575 A1 * | 12/2011 | Pope | H04N 21/8586 709/220 |
| 2011/0321062 A1 * | 12/2011 | Pope et al. | 719/318 |
| 2012/0079502 A1 | 3/2012 | Kwan et al. | |
| 2013/0159472 A1 * | 6/2013 | Newton | H04L 67/2852 709/219 |
| 2014/0172944 A1 * | 6/2014 | Newton | H04L 67/289 709/202 |
| 2014/0344453 A1 * | 11/2014 | Varney | H04L 41/0803 709/224 |
| 2015/0074259 A1 * | 3/2015 | Ansari et al. | 709/224 |
| 2015/0128121 A1 * | 5/2015 | Garcia | G06F 8/65 717/170 |
| 2016/0119417 A1 * | 4/2016 | Fang | H04L 67/1095 709/219 |

OTHER PUBLICATIONS

Deng, et al., "DAnCE: A QoS-enabled Component Deployment and Configuration Engine", In Proceedings of the 3rd Working Conference on Component Deployment, Nov. 28, 2005, 15 pages.
"International Search Report & Written Opinion for PCT Application No. PCT/US2014/039877", Mailed Date: Aug. 26, 2014, 15 Pages.
Driscoll, Adam, "Microsoft Windows PowerShell 3.8 First Look", A Quick, Succinct Guide to the New and Exciting Features in PowerShell 3.0, Oct. 2012, 200 Pages.
European Patent Office, "International Preliminary Report on Patentability," issued in PCT Application No. PCT/US2014/039877, mailed Date: Sep. 21, 2015, 8 Pages.

* cited by examiner

DISTRIBUTED STATE MODEL FOR SYSTEM CONFIGURATION SYNCHRONIZATION

CROSS-REFERENCE TO RELATED APPLICATIONS

This application claims the benefit of the filing date of U.S. Provisional Patent Application No. 61/830,128, which is titled "Distributed State Model for System Configuration Synchronization" and was filed on Jun. 2, 2013, the disclosure of which is hereby incorporated by reference herein in its entirety.

BACKGROUND

In an application deployment where components are deployed to different computers or nodes, a deployment on one node often is dependent upon the state of a deployment on another node. For example, a primary application on one node may need to be in a specified state before deployment of a redundant or secondary application can proceed on another node. Existing systems typically use a single point, such as a centralized coordinating system or a central repository, to orchestrate the deployment on each node.

A centralized coordinating system or a central repository may control the deployment on each node and ensure that applications on each are deployed in the desired order. As each application deployment moves from one state to the next, the central repository verifies that the other nodes are in the required state before proceeding. However, in the deployment of applications across multiple nodes in existing systems, the nodes are not capable of directly determining the status of the application on other nodes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In a typical datacenter or cloud-computing application deployment, different components are located on different computers or nodes. Each of the components needs to be deployed and configured for the application to work correctly. During deployment and configuration, coordination between the different components is required for proper configuration.

Desired State Configuration provides a mechanism for coordinating configuration steps between computers or nodes. Coordination is based on the specific state—that is, a configuration step on node A will wait for another node B to reach a specific state before node A continues with its configuration. This coordination will be accomplished without the use of a central repository or a central coordination system. Existing configuration systems do not have a way of coordinating configuration steps between computers or nodes without using a central coordination system.

Aspects of example embodiments include:
  No requirement for a central coordinating system or a central repository;
  Ability to wait for configuration on a computer or node to reach a particular state;
  Ability to query for state of a computer or node; and
  Ability to wait for more than one computer or node to reach a desired state.

The synchronization model is passive, wherein a depending node queries the state of the nodes that it depends on rather than requiring the node to explicitly send a message to the waiting nodes. No action need be taken by the machines that are being waited upon. Synchronization is done through a pull model where the dependent node queries the target for its status, rather than relying on the target to actively notify the nodes that are waiting.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Desired State Configuration provides a distributed state model wherein one node can wait for one or more other nodes to reach a specified state. This is achieved by modeling synchronization as a special resource that can be configured.

In general, resources are configured using resource providers. Every resource is expected to define a schema that describes which properties of the resource can be configured. Enforcement of the resource's configuration is managed via the resource provider. A resource provider defines two functions for getting a resource to the desired state:
  Test-TargetResource—determines if a resource is in the desired state; and
  Set-TargetResource—sets a resource in the desired state.
A resource provider defines these two functions to use the system.

Synchronization across nodes is achieved by exposing a special synchronization resource. The resource provider functions behave as follows:
  The Test-TargetResource function checks whether a required resource on the remote machine or node is in a specified state.
  The Set-TargetResource function waits until the required resource on the remote machine or node is in the specified state and then sets a resource in a desired state.

By configuring a synchronization resource to reach the desired state, the Desired State Configuration system waits for a resource on a remote node or machine to reach a specific state. The resource does not depend on a state transition to trigger that it has completed. Instead, the synchronization resource observes the required remote nodes to determine if they are in the desired state. When a new depending node is added to an existing cluster in which all of the other nodes are in their final state, the new node simply validates that the required remote resources are in the desired state. The new node does not need to observe a state change in the remote resources; it simply determines the current state of the remote resources.

Figure 1:
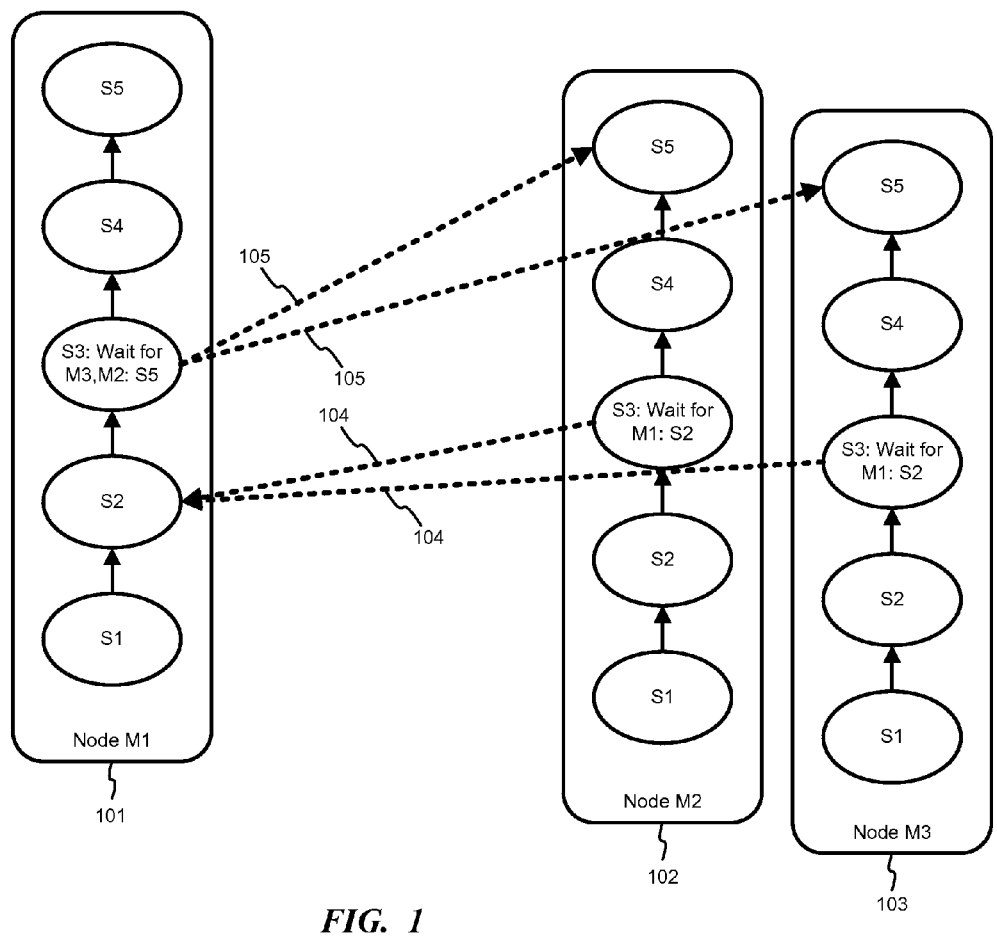
FIG. 1 illustrates a distributed state model in which resource providers on separate nodes control deployment of a local application based upon the state of the deployments on remote nodes.

FIG. 1 illustrates a distributed state model in which resource providers on nodes 101-103 control deployment of an application on one node based upon the state of resource deployments on the other nodes in a datacenter or cloud-computing environment. Each node 101-103 (M1-M3) has five local states (S1-S5). Locally, each node moves in sequence from state S1 to state S5. However, in some cases, a node must wait for a remote node to be in a particular state before moving to a next state locally. For example, at local state S3, node 101 (M1) cannot proceed until nodes 102, 103 (M2, M3) both reach a specified state S5.

Nodes 102 and 103 (M2, M3) each independently move from local state S1 to local state 3. However, before moving beyond local state S3, each node M2, M3 must wait for node M1 to reach its local state S2. When nodes M2, M3 reach local state S3, they each use the Test-TargetResource function 104 to determine the current state of node M1. In one embodiment, state S3 on nodes M2, M3 query node M1 for state S2 to determine if S2 is in a desired state. If S2 on node M1 is in a desired state, then each state S3on nodes M2and M3 is in a desired state and flow moves on to local states S4 and S5 on M2and M3. However when nodes M2, M3 are not in desired state, then S3 on nodes M2, M3 use the Set-TargetResource function to observe the state of S3 and to detect a later state change of S2 on node M1 to reach a desired state.

Node M1 sets local resources and moves through states S1 to S3, but must wait for remote nodes M2, M3 to reach state S5. When node M1 reaches local state S3, it uses the Test-TargetResource function 105 to determine the current state of nodes M2 and M3. When that function returns that nodes M2 and M3 are not in local states S5, then state S3 node M1 uses the Set-TargetResource function to observe states S5on nodes M2, M3and to detect a later state change of S5 on nodes M2 and M3 to reach a desired state.

Figure 2:
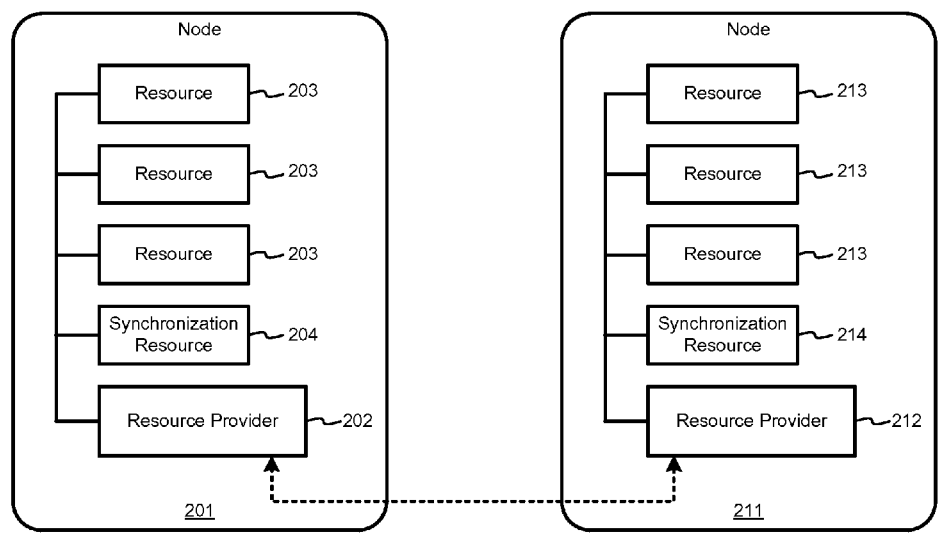
FIG. 2 illustrates nodes employing one embodiment of the invention.

FIG. 2 illustrates nodes 201, 211 employing one embodiment of the invention. Each node 201, 211 may be a distinct machine, such as a server or workstation computer on a distributed network, or may be one of many independent entities, such as virtual machines, running on the same device. A resource provider 202, 212 on each node manages the configuration of resources 203, 213. Resource provider 202, 212 configures and implements the functionality of their respective local resources 203, 213. Resource providers 202, 212 may also model synchronization as a resource 204, 214 when synchronization is required with other nodes. The synchronization resource 204, 214 is configured to reach a desired state that is dependent upon a remote resource reaching a specific state.

Any local resource 203 that is waiting for a remote node 211 to reach a particular state does not have to directly communicate with that remote node 211. Instead, the local resource 203 looks to the local synchronization resource 204 to determine the state of the remote resource 213. Resource providers 202, 212, which correspond to resources 203, 213, communicate with each other to determine how to configure synchronization resource 204, 214.

For example, synchronization resource 204 on node 201 is initially in a waiting state. Resource provider 202 uses the Test-TargetResource function to determine if a resource 213 on node 211 is in a desired state. When the function Test-TargetResource returns positive, then resource provider 202 uses the Set-TargetResource function to set local synchronization resource 204 to a specified state. Local resource 203 can then look locally at the state of synchronization resource 204 to determine if remote resource 213 is in the desired state.

The resource provider may use an API, for example, to observe the state of the remote resource. In one embodiment, the communication between nodes 201 and 211 is secure and reliable. Additionally, the communication may be time-bounded so that when the target resource does not meet a desired state, the resource provider will retry for a defined duration. In this way, one failure to detect a desired state will not cause a permanent failure.

The following text in Table 1 illustrates system-configuration synchronization for one example in which a cluster of database nodes are configured. In particular, at lines 49-55, the distributed state model described herein ensures that a database-service process has been started on a master node before starting the database-service process on secondary nodes.

TABLE 1

```

# Configure a cluster of database nodes

configuration DataBaseCluster
{
  ipmo Sync
  #
  # Set up the database master and secondary nodes...
  #
  foreach ($dbn in $dbHosts)
  {
    Node $dbn
    {
      # Ensure that the DatabaseService package is installed on all nodes
      Package DatabaseService
      {
        Path = $DatabaseServicePackageURI
      }
      if ($Node -eq $dbPrimary)
      {
        # Install the master DatabaseService configuration on this node
        File DatabaseServiceConfigFile
        {
          Requires = "[Package]DatabaseService"
          DestinationPath = $DatabaseServiceCustomizedConfigFile
          SourcePath = $DatabaseServiceMasterConfigFile
        }
        # Start the master DatabaseService process once everything is ready...
        WindowsProcess MasterDatabaseProcess
        {
          Path = "${DatabaseServiceInstalledRoot}\bin\DatabaseService.exe"
          Arguments = "-w -f
"'$ {installedPath}\conf\DatabaseService.conf'" -d "'$installeRoot'""
          Requires = "[File]DatabaseServiceConfigFile"
        }
      }
      else
      {
        # Install the DatabaseService secondary configuration file on this node
        File DatabaseServiceConfigFile
        {
          Requires = "[Package]DatabaseService"
```

TABLE 1-continued

```
        DestinationPath = $DatabaseServiceCustomizedConfigFile
        SourcePath = $DatabaseServiceSecondaryConfigFile
      }
      # Wait for DatabaseService process to be started on the master
      node
      # before starting secondary node processes
      WaitFor MasterDatabaseProcess
      {
        Requires = "[File]DatabaseServiceConfigFile"
        RequiredResourceID = '[WindowsProcess]DatabaseService'
        MachineName = $dbPrimary
      }
      # Start the DatabaseService process once everything is
      # ready and the master is up and running...
      WindowsProcess DatabaseService
      {
        Path = "$ {installedRoot}\bin\mysyld.exe"
        Arguments = " -w -f
"'${installedPath}\conf\DatabaseServiced.conf '" -d "'$installRoot'""
        Requires = "[Event]DbMasterReady"
        Credential = Get-Credential
      }
    }
  }
 }
}
```

Figure 3:
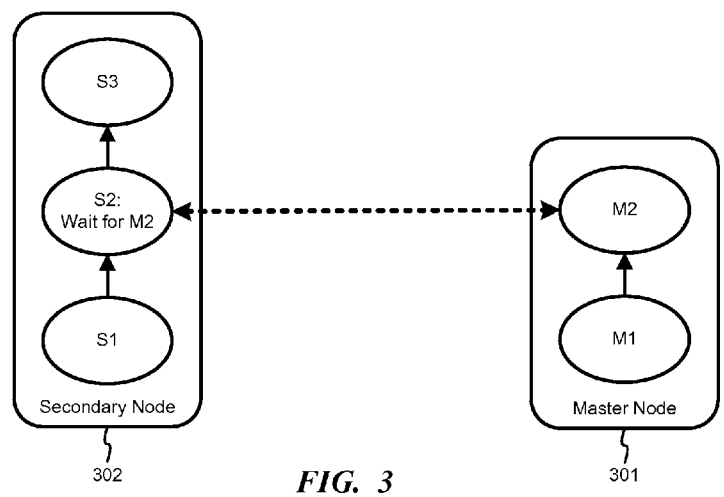
FIG. 3 illustrates two nodes of a distributed database application using example configuration text.

FIG. 3 illustrates two nodes of a distributed database application using the configuration text of Table 1. Master node 301 starts in an initial, unconfigured state M1. Once a database has been configured on master node 301, the node moves to state M2. Secondary node 302 starts in an initial, unconfigured state S1 and then moves to a waiting state S2. A resource provider on secondary node 302 may define a local synchronization resource corresponding to state S2. The synchronization resource is configured by a resource using the Test-TargetResource and Set-TargetResource functions.

The secondary node 302 moves from state S1 to state S2 when configuration begins. In state S2, the secondary node 302 looks at the local synchronization resource. If the master node 301 has reached state M2 and has configured a database, then the local synchronization resource on secondary node 302 will indicate that state. Secondary node 302 can then complete configuration of its database and move to a configured state S3.

Figure 4:
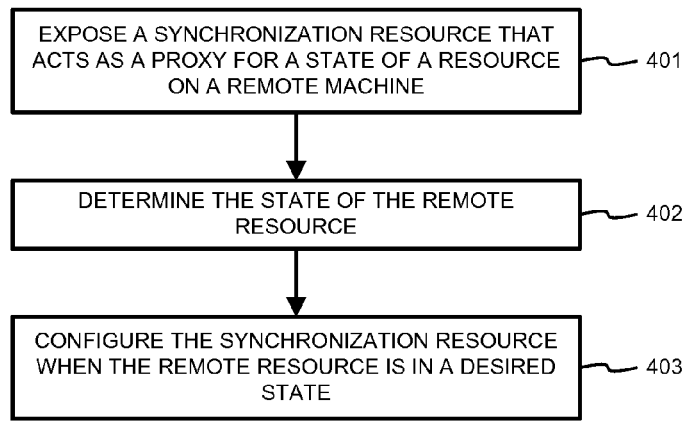
FIG. 4 is a flowchart illustrating a method or process for configuring a computing device according to one embodiment.

FIG. 4 is a flowchart illustrating a method or process for configuring a computing device according to one embodiment. In step 401, a node exposes a synchronization resource that acts as a proxy for the state of a resource on a remote machine. In step 402, the node determines a state of the remote resource. A test function may be defined to check whether the remote resource is in the desired state. A set function may also be defined to set a state of the synchronization resource when the remote resource is in the desired state.

In step 403, the node configures additional resources when the remote resource is in the desired state. The additional resources may be configured, using a resource provider, for example, once a synchronization resource indicates that the remote resource has reached the desired state.

In addition to a single remote resource, the node may evaluate the states of a plurality remote resources. The synchronization resource may be configured when one or more of the remote resources are in the desired state or when all of the remote resources are in the desired state.

Figure 5:
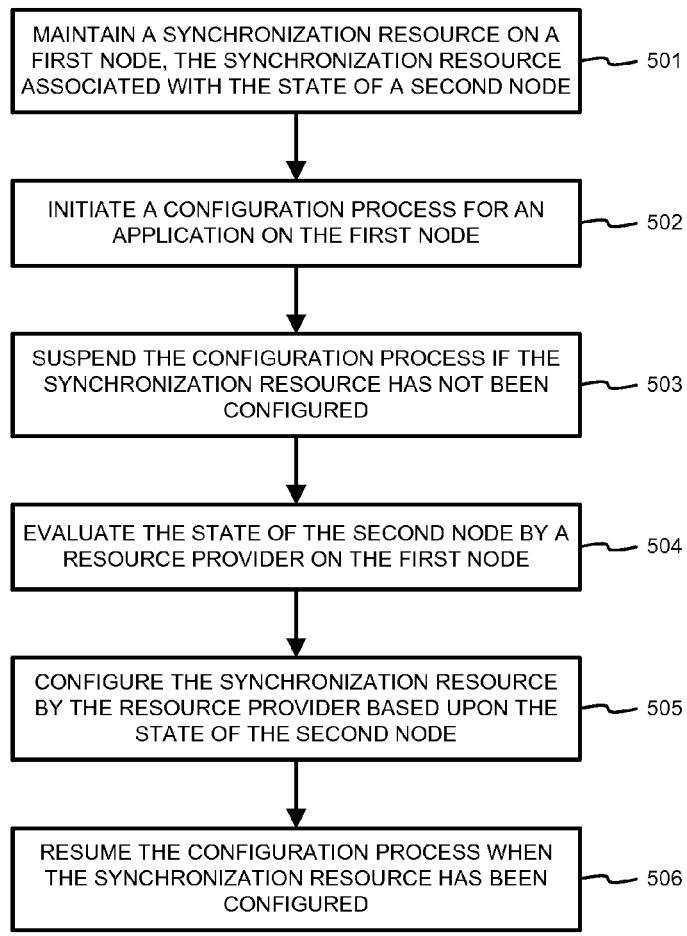
FIG. 5 is a flowchart illustrating a method or process for configuring a resource according to another embodiment.

FIG. 5 is a flowchart illustrating a method or process for configuring a resource according to another embodiment. In step 501, a synchronization resource is provided on a first node. The synchronization resource is associated with a state of a second node. In step 502, a configuration process for an application is initiated on the first node.

In step 503, the configuration process is suspended if the synchronization resource indicates that the remote resource is not in a desired state. The configuration process may move through a hierarchy of local states and waits in a designated local state until the second node is in a desired state. The process moves from the designated local state to a next local state when the synchronization resource indicates that the second node is in a desired state.

In step 504, the state of the second node is evaluated by a resource provider on the first node. The state of the second node indicates whether or not a resource has been configured on the second node. In step 505, the synchronization resource is configured by the resource provider based upon the state of the second node. In step 506, the configuration process is resumed when the synchronization resource has been configured.

The first node and the second node may be hosted on a same machine, on separate machines, on a distributed computing network, or in any other configuration in which a first resource depends upon the state of a remote resource.

The synchronization resource is a passive pull system. It is the responsibility of the waiting node to observe the state of the remote node. In the embodiments disclosed herein, the synchronization resource is a proxy for a remote resource and simply reflects the state of that resource. Synchronization is based on resources on the remote machine being in a particular state rather than waiting for a state change. In existing message-based systems, when the node that is being waited upon changes state, it sends a message to the nodes that are waiting for it. In the present invention, the node being waited on does not need to keep track of the number of other nodes that are waiting for it. The remote node that is being waited on does not need to send a message to the waiting nodes. This provides a robust configuration since it is not message-based, so messages do not get lost and there is no requirement for message retries.

Figure 6:
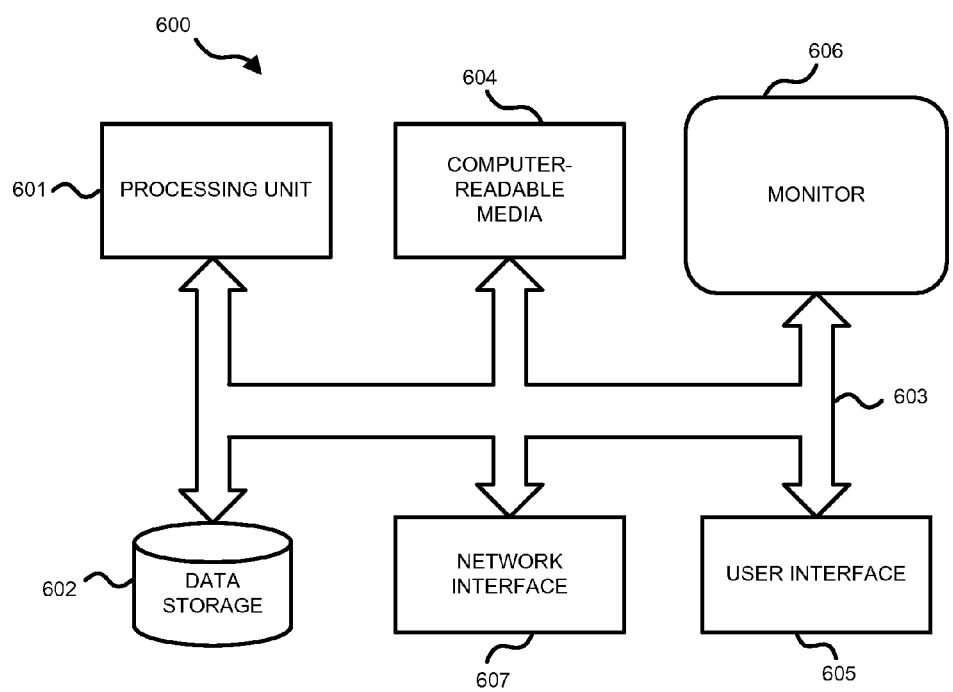
FIG. 6 illustrates an example of a suitable computing and networking environment for configuring application and resources on different nodes or machines.

FIG. 6 illustrates an example of a suitable computing and networking environment 600 on which the examples of FIGS. 1-5 may be implemented for configuring application and resources on different nodes or machines. The computing system environment 600 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 600. Components may include, but are not limited to, various hardware components, such as processing unit 601, data storage 602, such as a system memory, and system bus 603 that couples various system components including the data storage 602 to the processing unit 601. The system bus 603 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 600 typically includes a variety of computer-readable media 604. Computer-readable media 604 may be any available media that can be accessed by the computer 600 and includes both volatile and nonvolatile media, and removable and non-removable media, but excludes propagated signals. By way of example, and not limitation, computer-readable media 604 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 602 includes computer storage media in the form of volatile and/or nonvolatile memory such as read only memory (ROM) and random access memory (RAM). A basic input/output system (BIOS), containing the basic routines that help to transfer information between elements within computer 600, such as during start-up, is typically stored in ROM. RAM typically contains data and/or program modules that are immediately accessible to and/or presently being operated on by processing unit 601. By way of example, and not limitation, data storage 602 holds an operating system, application programs, and other program modules and program data.

Data storage 602 may also include other removable/non-removable, volatile/nonvolatile computer storage media. By way of example only, data storage 602 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 6, provide storage of computer-readable instructions, data structures, program modules and other data for the computer 600.

A user may enter commands and information through a user interface 605 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 601 through a user input interface 605 that is coupled to the system bus 603, but may be connected by other interface and bus structures, such as a parallel port, game port or a universal serial bus (USB). A monitor 606 or other type of display device is also connected to the system bus 603 via an interface, such as a video interface. The monitor 606 may also be integrated with a touch-screen panel or the like. Note that the monitor and/or touch screen panel can be physically coupled to a housing in which the computing device 600 is incorporated, such as in a tablet-type personal computer. In addition, computers such as the computing device 600 may also include other peripheral output devices such as speakers and printer, which may be connected through an output peripheral interface or the like.

The computer 600 may operate in a networked or cloud-computing environment using logical connections 607 to one or more remote devices, such as a remote computer. The remote computer may be a personal computer, a server, a router, a network PC, a peer device or other common network node, and typically includes many or all of the elements described above relative to the computer 600. The logical connections depicted in FIG. 6 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 600 may be connected to a public or private network through a network interface or adapter 607. In some embodiments, a modem or other means for establishing communications over the network. The modem, which may be internal or external, may be connected to the system bus 603 via the network interface 607 or other appropriate mechanism. A wireless networking component such as comprising an interface and antenna may be coupled through a suitable device such as an access point or peer computer to a network. In a networked environment, program modules depicted relative to the computer 600, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At a computing device including a processor and system memory, a method for configuring the computing device, the method comprising:
   initiating a local configuration process;
   suspending the local configuration process when a specific state of a remote resource is required by the local configuration process;
   specifying a local synchronization resource to serve as a proxy for the state of the remote resource;
   configuring, by a local resource provider, a test function to determine whether the remote resource is in the specific state;
   configuring, by the local resource provider, a set function that configures the local synchronization resource when the test function determines the remote resource is in the specific state; and
   resuming the local configuration process when the local synchronization resource has been configured to indicate the remote resource is in the specific state.

2. The method of claim 1, further comprising:
   evaluating, by the local resource provider, a state for each of a plurality remote resources; and
   configuring, by the local resource provider, the local synchronization resource when one or more of the remote resources is in the specific state.

3. The method of claim 1, further comprising:
   evaluating, by the local resource provider, a state for each of a plurality remote resources; and
   configuring, by the local resource provider, the local synchronization resource when all of the remote resources are in the specific state.

4. A method for configuration of a computing device comprising:
   initiating a local configuration process on a first node;
   suspending the local configuration process when a specific state of one or more second nodes is required by the local configuration process;
   maintaining a local synchronization resource on the first node, the synchronization resource serving as a proxy for the state of the one or more second nodes;
   configuring, by a local resource provider, a test function to determine whether the one or more second nodes are in the specific state;
   configuring, by the local resource provider, a set function that configures the local synchronization resource when the test function determines the one or more second nodes are in the specific state; and
   resuming the local configuration process when the local synchronization resource has been configured to indicate the one or more second nodes are in the specific state.

5. The method of claim 4, further comprising:
   moving through a hierarchy of local states while the local configuration process is suspended.

6. The method of claim 5, further comprising:
   waiting in a designated local state until the one or more second nodes are in a specific state; and
   moving from the designated local state to a next local state when the local synchronization resource indicates that the one or more second nodes are in a specific state.

7. The method of claim 4, wherein the state of the one or more second nodes indicates whether or not a resource has been configured on the second nodes.

8. The method of claim 4, wherein the first node and the second nodes are hosted on a single machine.

9. The method of claim 4, wherein the first node and the second nodes are hosted on separate machines.

10. The method of claim 4, wherein the first node and the second nodes are hosted on a distributed computing network.

11. A computer-readable storage device having stored thereon computer-executable instructions that, when executed by a processor of a computing system, perform a method for configuring the device to perform steps comprising:
    initiating a configuration process on a first node;
    suspending the configuration process when a specific state of a second node is required by the configuration process;
    providing a synchronization resource on the first node, wherein the synchronization serves as a proxy for the state of the second node;
    configuring, by a resource provider on the first node, a test function to determine whether the second node is in the specific state;
    configuring, by the resource provider, a set function that configures the synchronization resource when the test function determines the second node is in the specific state; and
    resuming the configuration process when the synchronization resource has been configured to indicate the second node is in the specific state.

12. The device of claim 11, wherein the device is further configured to perform steps comprising:
    moving through a hierarchy of local states while the configuration process is suspended.

13. The device of claim 11, wherein the device is further configured to perform steps comprising:
    waiting in a designated local state until the second node is in a desired state; and
    moving from the designated local state to a next local state when the synchronization resource indicates that the second node is in a desired state.

14. The device of claim 11, wherein the state of the second node indicates whether or not a resource has been configured on the second node.

15. The device of claim 11, wherein the device is further configured to perform steps comprising:
    configuring the state of the synchronization resource when the remote resource is in the specific state.

16. The device of claim 11, wherein the device is further configured to perform steps comprising:
    evaluating a state for each of a plurality remote resources; and
    configuring the synchronization resource when one or more of the remote resources is in specific state.

17. The device of claim 11, wherein the device is further configured to perform steps comprising:
    evaluating, by the local resource provider, a state for each of a plurality remote resources; and configuring, by the local resource provider, the synchronization resource when all of the remote resources are in the specific state.

\* \* \* \* \*